United States Patent [19]
Chen et al.

[11] Patent Number: 6,156,814
[45] Date of Patent: Dec. 5, 2000

[54] AMIDO FUNCTIONAL AMINE CATALYSTS FOR THE PRODUCTION OF POLYURETHANES

[75] Inventors: Ning Chen, Jamison; Richard Van Court Carr, Allentown; Mark Leo Listemann, Kutztown; Richard Paul Underwood, Allentown, all of Pa.

[73] Assignee: Air Products and Chemicals, Inc., Allentown, Pa.

[21] Appl. No.: 09/276,962

[22] Filed: Mar. 26, 1999

[51] Int. Cl.[7] .......................................................... C08J 9/04
[52] U.S. Cl. ........................... 521/129; 521/155; 521/163; 521/167; 521/170; 521/902; 528/53; 528/65
[58] Field of Search ...................................... 521/129, 155, 521/163, 167, 170, 902; 528/53, 65

[56] References Cited

U.S. PATENT DOCUMENTS

| | | |
|---|---|---|
| 3,073,787 | 1/1963 | Krakler . |
| 4,049,591 | 9/1977 | McEntire et al. . |
| 4,248,930 | 2/1981 | Haas et al. . |
| 4,548,902 | 10/1985 | Hasler et al. . |
| 5,824,711 | 10/1998 | Kimock et al. .......................... 521/129 |

FOREIGN PATENT DOCUMENTS

| | | |
|---|---|---|
| 799821 | 10/1997 | European Pat. Off. . |
| 9401406 | 1/1994 | WIPO . |

*Primary Examiner*—J. Cooney
*Attorney, Agent, or Firm*—Mary E. Bongiorno

[57] ABSTRACT

The use of 3-[3-(dimethylamino)propyl]-propionamide (Formula I) and 3,3'-{[3-(dimethylamino)propyl]imino}bis-propanamide (Formula II) as catalysts in the production of polyurethanes.

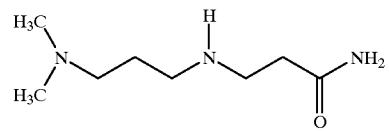

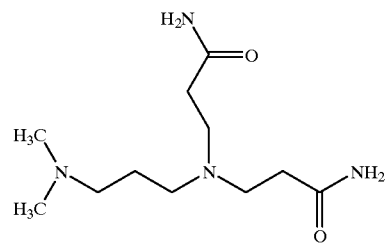

10 Claims, No Drawings

AMIDO FUNCTIONAL AMINE CATALYSTS FOR THE PRODUCTION OF POLYURETHANES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Polyurethanes are useful in a variety of applications. For example, polyurethane elastomers are used in automotive parts, shoe soles, and other products in which toughness, flexibility, strength, abrasion resistance, and shock-absorbing properties are required. Polyurethanes are also used in coatings and in flexible and rigid foams.

Polyurethanes, in general, are produced by the reaction of a polyisocyanate and a polyol in the presence of a catalyst. The catalyst is typically a low molecular weight tertiary amine such as triethylenediamine.

Polyurethane foams are produced through the reaction of a polyisocyanate with a polyol in the presence of various additives. One class of additives which is particularly effective as blowing agents is the chlorofluorocarbons (CFCs). CFCs vaporize as a result of the reaction exotherm during polymerization and cause the polymerizing mass to form a foam. However, the discovery that CFCs deplete ozone in the stratosphere has resulted in mandates for restricting CFC use. Therefore, more efforts have gone into the development of alternatives to CFCs for forming urethane foams and water blowing has emerged as an important alternative. In this method, blowing occurs from carbon dioxide generated by the reaction of water with the polyisocyanate. Foams can be formed by a one-shot method or by formation of a prepolymer and subsequent reaction of the prepolymer with water in the presence of a catalyst to form the foam. Regardless of the method, a balance is needed between reaction of the isocyanate and the polyol (gelling) and the reaction of the isocyanate with water (blowing) in order to produce a polyurethane foam in which the cells are relatively uniform and the foam has specific properties depending on the anticipated application; for example, rigid foams, semi-rigid foams, and flexible foams.

The ability of the catalyst to selectively promote either blowing or gelling is an important consideration in selecting a catalyst for the production of a polyurethane foam with specific properties. If a catalyst promotes the blowing reaction to too high a degree, carbon dioxide will be evolved before sufficient reaction of isocyanate with polyol has occurred. The carbon dioxide will bubble out of the formulation, resulting in collapse of the foam and production of a poor quality foam. At the opposite extreme, if a catalyst promotes the gelling reaction too strongly, a substantial portion of the carbon dioxide will be evolved after a significant degree of polymerization has occurred. Again, a poor quality foam is produced; characterized by high density, broken or poorly defined cells, or other undesirable features. Frequently, a gelling catalyst and a blowing catalyst are used together to achieve the desired balance of gelling and blowing in the foam.

Tertiary amine catalysts have been used to in the production of polyurethanes. The tertiary amine catalysts accelerate both blowing (reaction of water with isocyanate to generate carbon dioxide) and gelling (reaction of polyol with isocyanate) and have been shown to be effective in balancing the blowing and gelling reactions to produce a desirable product. However, typical tertiary amines used as catalysts for polyurethane production generally have offensive odors and many are highly volatile due to low molecular weight. Release of tertiary amines during polyurethane production may present significant safety and toxicity problems, and release of residual amines from consumer products is generally undesirable.

Amine catalysts which contain amide functionality have an increase in molecular weight and hydrogen bonding and reduced volatility and odor when compared to related compounds lacking amide functionality. An advantage of the use of compounds having amide functionality in the preparation of polyurethanes is that the amide chemically bonds with the urethane during the polymerization reaction and thus is not released from the finished product. However catalyst structures which contain both amine and amide functionality typically have low to moderate activity and promote both the blowing and gelling reaction to varying extents.

Examples of patents directed to compounds having both tertiary amine and amide functionality are described below:

U.S. Pat. No. 3,073,787 (Krakler, 1963) discloses an improved process for preparing isocyanate foams in which catalysts made from 3-dialkylaminopropionamide and 2-dialkylaminoacetamide are used.

U.S. Pat. No. 4,049,591 (McEntire et al., 1977) discloses a group of 1,3-substituted bis-(N,N,-dimethylaminopropyl) amines as catalysts in reacting polyisocyanate with polyols. The substituted group can be cyano, amide, ester, or ketone.

U.S. Pat. No. 4,248,930 (Haas et al., 1981) discloses several tertiary amines catalysts for the production of polyurethane resins. In the example, a mixture of bis (dimethylamino-n-propyl)amine and N-methyl-N'-(3-formylaminopropyl)piperazine is used to form a PVC/polyurethane-foam laminate.

U.S. Pat. No. 4,548,902 (Hasler et al., 1985) discloses combining a polybasic amino compound, such as 3,3'-{[3-(dimethylamino)propyl]imino}bis-propanamide, with a direct or reactive dyestuff for use in cellulose dyeing applications.

WO 94/01406 (Beller, et al., 1994) discloses a group of chelating agents, such as 3-[3-(N',N'-dimethylaminopropyl)-N-methyl]propionamide, and 3-[3-(dimethylamino)-propyl]propionamide, suitable for producing paramagnetic complexes which can be used as contrast agents in magnetic resonance diagnosis applications.

EP 799,821 (Gerkin, et al., 1997) discloses amine/amide catalysts, such as the following two compounds,

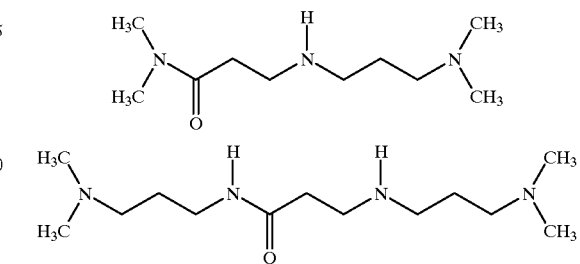

for formation of polyurethanes. The catalysts are reported to have low fugitivity due to their reactivity with isocyanates.

BRIEF SUMMARY OF THE INVENTION

The present invention is directed to the use of the following two compounds as catalysts in the production of polyurethanes: 3-[3-(dimethylamino)propyl]-propionamide (formula I below) and 3,3'-{[3-(dimethylamino)propyl]imino}bis-propanamide (Formula II below).

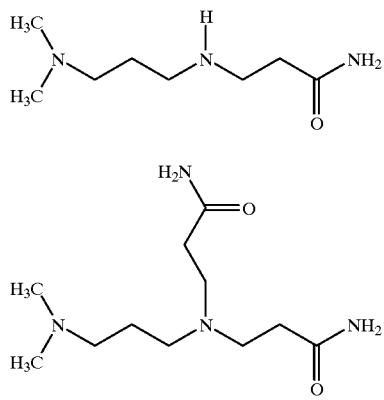

The compounds represented by I and II are effective catalysts in the production of polyurethanes in which an organic polyisocyanate reacts with a compound containing a reactive hydrogen, such as, an alcohol, a polyol, an amine or water. They are particularly useful for the gelling reaction in which an organic polyisocyanate reacts with a polyol. Among the advantages provided by the compounds in the production of polyurethanes are:

they are very active catalysts;

they are selective to the gelling reaction, i.e., the reaction between an organic polyisocyanate and a polyol; and they bind to the urethane, resulting in little or none of the compound being released from the finished product.

DETAILED DESCRIPTION OF THE INVENTION

The compounds of this invention are readily prepared by the Michael addition of an amino functional amine to an acrylamide. The amino functional amine and acrylamide are present in the reaction mixture in molar ratio of from about 1:10 to about 20:1, and preferably at a ratio of 1 to 2 moles amino amine per equivalent of acrylamide. Air is used to saturate the reaction mixture in order to inhibit the free radical polymerization of acrylamide.

The reaction is preferably carried out at atmospheric pressure; however other pressures can be used.

The reaction can be carried out at a temperature ranging from 0 to 130° C.; preferably from 30 to 100° C., and is allowed to run for 0.1 to 100 hours, preferably, 2 to 12 hours.

In principle, the reagent monomer can be reacted in batch fashion, via staged addition, or continuously. Synthesis is advantageously performed in a mixture of the neat monomers, however, an inert solvent for both reactants may be employed. Examples of appropriate solvents include amides and ethers; preferred solvents are ethers.

The catalyst compositions according to this invention can catalyze (1) the reaction between an isocyanate functionality and an active hydrogen-containing compound, such as, an alcohol, a polyol, an amine, or water; and (2) the trimerization of the isocyanate functionality to form polyisocyanurates. The compositions are especially useful as catalysts in the reaction between an organic polyisocyanate and a polyol and in the preparation of polyurethane foams in which an organic polyisocyanate reacts with a polyol in the presence of a blowing agent, such as water.

Polyurethane products are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether or polyester polyol.

Examples of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatch or premix compositions frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

A catalytically effective amount of the catalyst composition is used in the polyurethane formulation. Suitable amounts of the catalyst composition may range from about 0.01 to 10 parts per 100 hundred parts polyol (phpp). Preferred amounts range from 0.05 to 1.5 phpp.

The catalyst composition may be used in combination with other tertiary amine, organotin and carboxylate urethane catalysts well known in the urethane art. For example, suitable gelling catalysts include but are not limited to trimethylamine, triethylamine, tributyl-amine, trioctylamine, diethyl cyclohexylamine, N-methylmorpholine, N-ethylmorpholine, N-octadecylmorpholine (N-cocomorpholine), N-methyldiethanolamine, N,N-dimethylethanolamine, N,N'-bis(2-hydroxypropyl)piperazine, N,N,N',N'-tetramethylethylene-diamine, N,N,N',N'-tetramethyl-1,3-propanediamine, triethylenediamine (1,4-diaza-bicyclo[2.2.2]octane), 1,8-diazabicyclo(5.4.0)undecene-7, 1,4-bis(2-hydroxypropyl)-2-methylpiperazine, N,N'-dimethylbenzylamine, N,N-dimethylcyclohexylamine, benzyltriethylammonium bromide, bis(N,N-diethylaminoethyl)adipate, N,N-diethylbenzylamine, N-ethylhexamethyleneamine, N-ethylpiperidine, alpha-methylbenzyldimethylamine, dimethylhexadecylamine, dimethylcetylamine, and the like. Suitable blowing catalysts include but are not limited to bis(dimethylaminoethyl)ether, pentamethyidiethylenetriamine, 2-[N-(dimethylaminoethoxyethyl)-N-methylamino]ethanol, and the like. Suitable blowing catalysts include but are not limited to bis(dimethylaminoethyl)ether, pentamethyidiethylenetriamine, 2-[N-(dimethylaminoethoxyethyl)-N-methylamino]ethanol, and the like.

Following is a general polyurethane flexible foam formulation having a 1–3 lb/ft³ (16–48 kg/m³) density (e.g., foams used in automotive seating) containing a catalyst such as the catalyst composition according to the invention:

| Component | Parts by Weight |
|---|---|
| Polyol | 20–100 |
| Polymer Polyol | 80–0 |
| Silicone Surfactant | 1–2.5 |
| Blowing Agent (e.g. water) | 2–4.5 |
| Crossslinker | 0.5–2 |
| Catalyst | 0.5–2 |
| Isocyanate Index | 70–115* |

*Isocyanate Index = (mole isocyanate/mole active hydrogen) × 100

The invention will be further clarified by a consideration of the following examples, which are intended to be purely exemplary of the invention.

EXAMPLE 1

Preparation of 3-[3-(dimethylamino)propyl]-propionamide

A 50 ml 3 neck round bottom flask was fitted with the following: magnetic stirrer, reflux condenser, air bubbler, and a temperature controlled oil bath. The flask was charged with 7.1 g of acrylamide. 3-Dimethyl-1,3-propanediamine (10.2 g) was added in one portion to the reaction flask at ambient temperature. After the addition, the reaction mixture was stirred at 85° C. for 4 hours. The viscosity of the liquid increased by the end of the reaction. The mixture was cooled to ambient temperature. The resulting mixture was filtered through a Celite layer. The filtrate was collected for foam application. $^1$H NMR showed that the product was the desired structure, and that there was no residual acrylamide.

EXAMPLE 2

Preparation of 3,3'-{[3-(dimethylamino)propyl]imino}bis-propanamide

A 50 ml 3 neck round bottom flask was fitted with the following: magnetic stirrer, reflux condenser, air bubbler, and a temperature controlled oil bath. The flask was charged with 14.2 g of acrylamide. 3-Dimethyl-1,3-propanediamine (10.2 g) was added in one portion to the reaction flask at ambient temperature. After the addition, the reaction mixture was stirred at 101° C. for 8 hours and a slow stream of air was bubbled through the reaction mixture for the entire 8 hours. The mixture was cooled to ambient temperature. The resulting mixture was filtered through a Celite layer. The filtrate was collected for foam application. H NMR showed that the product was the desired structure, and that there was only 6.5% residual acrylamide, with no evidence for acrylamide polymer formation.

General Procedure for Preparation of Polyurethane Foams

Polyurethane foams were prepared in a conventional manner using the following premix formulation:

| Premix Formulation | |
|---|---|
| Component | Parts by Weight |
| E-648 (ethylene oxide tipped polyether polyol, marketed by Arco) | 60 |
| E-519 (styrene-acrylonitrile copolymer filled polyether polyol, marketed by Arco) | 40 |
| Dabco ® DC-5043 (silicone surfactant marketed by Air Products and Chemicals, Inc.) | 1.5 |
| Diethanolamine | 1.75 |
| Water | 3.25 |
| TDI 80 (mixture of 80 wt. % 2,4-TDI and 20 wt. % 2,6-TDI) | 105 (isocyanate index) |

For each foam, the catalyst was added to 202 g of the above premix in a 32 oz (951 ml) paper cup and the formulation was mixed for 20 seconds at 5000 RPM using an overhead stirrer fitted with a 2 inch (5.1 cm) diameter stirring paddle. Sufficient TDI 80 was added to make a 105 index foam [index=(mole isocyanate/mole active hydrogen)×100] and the formulation was mixed well for 5 seconds using the same overhead stirrer. The 32 oz. cup was dropped through a hole in the bottom of a 128 oz. (3804 ml) paper cup placed on a stand. The hole was sized to catch the lip of the 32 oz. cup. The total volume of the foam container was 160 oz. (4755 ml). Foams approximated this volume at the end of the foam forming process. Times to reach the top of the mixing cup (TOC1), the top of the 128 oz. cup (TOC2), and maximum foam height were recorded.

EXAMPLE 3

Preparation of foam using 3-[3-(dimethylamino)propyl]-propionamide as Gelling Catalyst

| Catalyst | TOC1 (sec.) | TOC2 (sec.) | Full Height (sec.) | Foam Height (mm) |
|---|---|---|---|---|
| 0.25 pphp DABCO 33LV[a]/0.10 pphp DABCO BL-11[b] | 12.74 | 44.02 | 127.27 | 409.05 |
| 0.52 3-[3-(dimethylamino)propyl]-propionamide/0.10 pphp DABCO BL-11 | 12.02 | 45.65 | 133.91 | 404.89 |

[a]gelling catalyst; 33 wt. % triethylene diamine in dipropylene glycol
[b]blowing catalyst; 70 wt. % Bis(N,N-dimethylaminoethyl) ether in dipropylene glycol.

EXAMPLE 4

Preparation of foam using 3,3'-{[3-(dimethylamino)propyl]imino}bis-propanamide as Gelling Catalyst

| Catalyst | TOC1 (sec.) | TOC2 (sec.) | Full Height (sec.) | Foam Height (mm) |
|---|---|---|---|---|
| 0.25 pphp DABCO 33LV/0.10 pphp DABCO BL-11 | 12.74 | 44.02 | 127.27 | 409.05 |
| 0.52 pphp 3,3'-{[3-(dimethyl-amino)propyl]-imino} bis-propanamide/0.10 pphp DABCO BL-11 | 11.36 | 44.46 | 136.28 | 405.99 |

Examples 3 and 4 show that 3-[3-(dimethylamino)propyl]-propionamide and 3,3'-{[3-(dimethylamino)propyl]imino}bis-propanamide are very effective gelling catalysts.

What is claimed is:

1. A method for preparing a polyurethane comprising reacting an organic polyisocyanate with a compound containing a reactive hydrogen in the presence of a catalyst composition comprising a compound selected from the group consisting of 3-[3-(dimethylamino)propyl]-propionamide, 3,3'-{[3-(dimethylamino)propyl]imino}bis-propanamide, and combinations of 3-[3-(dimethylamino)propyl]-propionamide and 3,3'-{[3-(dimethylamino)propyl]imino}bis-propanamide.

2. The method of claim 1 wherein the compound containing a reactive hydrogen is a polyol.

3. The method of claim 1 wherein the catalyst composition comprises 3-[3-(dimethylamino)propyl]-propionamide.

4. The method of claim 1 wherein the catalyst composition comprises 3,3'-{[3-(dimethylamino)-propyl]imino}bis-propanamide.

5. A method for preparing a polyurethane foam comprising reacting an organic polyisocyanate with a polyol in the presence of a blowing agent and a catalyst composition comprising a compound selected from the group consisting of 3-[3-(dimethylamino)propyl]-propionamide, 3,3'-{[3-(dimethylamino)propyl]imino}bis-propanamide, and combinations of 3-[3-(dimethylamino)propyl]-propionamide and 3,3'-{[3-(dimethylamino)propyl]imino}bis-propanamide.

6. The method of claim 5 wherein the blowing agent is water.

7. The method of claim 6 wherein the compound is 3-[3-(dimethylamino)propyl]-propionamide.

8. The method of claim 6 wherein the compound is 3,3'-{[3-(dimethylamino)-propyl]imino}bis-propanamide.

9. The method of claim 6 wherein the catalyst composition also comprises a blowing catalyst.

10. The method of claim 9 wherein the blowing catalyst is a bis(dimethyl-aminoethyl)ether.

* * * * *